United States Patent [19]

Shibahara et al.

[11] Patent Number: 5,753,223
[45] Date of Patent: May 19, 1998

[54] GRANULAR FEED ADDITIVES FOR RUMINANTS CONTAINING LIPASE, BILE POWDER AND PANCREATIN

[75] Inventors: Susumu Shibahara; Naoko Kanno; Nobuyoshi Kitamura; Hiromi Suzuki; Toru Ikeda, all of Kawasaki, Japan

[73] Assignee: Ajinomoto Co., Inc., Tokyo, Japan

[21] Appl. No.: 611,507

[22] Filed: Mar. 6, 1996

Related U.S. Application Data

[63] Continuation of Ser. No. 224,861, Apr. 8, 1994, abandoned.

[30] Foreign Application Priority Data

Apr. 8, 1993 [JP] Japan ................... 5-081979
Mar. 24, 1994 [JP] Japan ................... 6-053741

[51] Int. Cl.$^6$ .................... A61K 38/54; A23K 1/165
[52] U.S. Cl. .................... 424/94.3; 424/94.2; 424/94.21; 424/442; 426/61
[58] Field of Search ................ 426/61; 424/94.3, 424/94.2, 94.21, 522, 442

[56] References Cited

U.S. PATENT DOCUMENTS

| | | | |
|---|---|---|---|
| 3,493,652 | 2/1970 | Hartman | 424/94.5 |
| 3,857,968 | 12/1974 | Haas et al. | |
| 4,447,412 | 5/1984 | Bilton | 424/16 |
| 5,093,128 | 3/1992 | Draguesku et al. | |
| 5,260,074 | 11/1993 | Sipos | 424/497 |
| 5,273,753 | 12/1993 | Ishihara | 424/94.5 |

FOREIGN PATENT DOCUMENTS

| | | |
|---|---|---|
| 0 404 085 A3 | 12/1990 | European Pat. Off. |
| 8175449 | 10/1983 | Japan |
| 0168351 | 8/1985 | Japan |
| 3317053 | 12/1988 | Japan |
| 2 153 199 | 1/1985 | United Kingdom |

OTHER PUBLICATIONS

Abstract; Publication No. JP4071451; Title: Formula Feed for Cattle; Inventor: Miyoshi Shigeto et al.

*Primary Examiner*—Irene Marx
*Attorney, Agent, or Firm*—Oblon, Spivak, McClelland, Maier & Neustadt, P.C.

[57] ABSTRACT

The invention relates to biologically active substances coated with a coating composition containing at least one substance selected from the group consisting of hardened vegetable fats and oils, hardened animal fats and oils, fatty acid esters and phospholipids and an enzyme and/or enzyme activator where the outermost surface portion of the coating layer contains substantially no enzyme and/or enzyme activator. The invention materials exhibit excellent protection in the rumen of ruminant animals and allow for the dissolution in the post-abomasum lower digestive organs of the ruminant.

4 Claims, No Drawings

GRANULAR FEED ADDITIVES FOR RUMINANTS CONTAINING LIPASE, BILE POWDER AND PANCREATIN

This application is a Continuation of application Ser. No. 08/224,861, filed on Apr. 8, 1994, now abandoned.

BACKGROUND OF THE INVENTION

1. Field of the Invention

The present invention relates to a feed additive composition for ruminant animals. More particularly, it relates to a feed additive composition for ruminant animals in which biologically active substances are coated with a coating composition which is stable in a first stomach (rumen) of a ruminant animal and which releases the biologically active substances in the animal's post-abomasum digestive organs, thereby permitting digestion and absorption of the biologically active substances in the post-abomasum digestive organs.

2. Discussion of the Background

In ruminant animals such as cattle and sheep, a substantial part of biologically active substances such as amino acids and vitamins are, if directly administered orally, degraded by microorganisms in the rumen, and are thus not effectively used by the animal. In this respect, ruminal by-pass coatings are important in the fields of, for example, feeds, nutrients and ruminant animal drugs to protect these biologically active substances from degradation by the microorganisms in the rumen and allow digestion and absorption thereof through the post-abomasum digestive organs.

Feed additives for ruminants containing biologically active substances coated with fatty acids having 12 or more carbon atoms, hardened animal/ vegetable oils, etc are known. Although such particles coated with fat or oil provide improved rumen protectability, it is difficult to dissolve the coating and biologically active substance in the post-abomasum digestive organs.

In this regard, a method has been proposed where another substance enhancing dissolution is used. In one case, biologically active substances are dispersed in the protective substances (such as fats and oils) and granulated and in another case the biologically active substance is coated with a protective substance such as fats and oils.

A method for dispersing biologically active substances in a protective substance is described in, for example, Japanese Patent Laid-Open No. 60-168351 which proposes a method of granulating biologically active substances, calcium carbonate in an amount of 20% by weight or more along with aliphatic monocarboxylic acids having 14 or more carbon atoms and hardened fats and oils etc. in an amount of 10% by weight or more. In addition, Japanese Patent Publication No. 59-10780 proposes a method of dispersing 30–50 weight % of biologically active substances in a protective substance consisting of 10–35% by weight of a salt of an aliphatic monocarboxylic acid having 14–22 carbon atoms or of a ricinoleic acid, the balance being an aliphatic monocarboxylic acid having 14–22 carbon atoms, a ricinoleic acid, hardened fats and oils or the like.

A method of coating biologically active substances with a protective substance is described in, for example, Japanese Patent Laid-Open No. 63-317053 which proposes a method for coating biologically active substances with a protective agent consisting of an aliphatic monocarboxylic acid having 12–24 carbon atoms, hardened fats and oils, lecithin and glycerin esters of fatty acid.

However, when a biologically active substance is dispersed in a protective substance according to the above method, the biologically active substance exists at and/or near a particle surface. Accordingly, the relative content of the biologically active substance should be lowered significantly to give weight to protectability. It is difficult with such a method to provide satisfactory protection considering that the residence time of biologically active water-soluble substances in the rumen ranges from several hours to several days. In addition, when an active substance is coated with a protective substance consisting of lecithin, glycerin esters of fatty acid, and fats and oils the strength of the coating layer is insufficient and the problem of protectability still remains. Further, lecithin and glycerin esters of fatty acid are used in the expectation of an emulsification of fats and oils. However, the coating provides insufficient dissolution considering the time required to pass through the post-abomasum digestive organs.

Finally, a method has been proposed wherein a biologically active material is coated with a pH responsive synthetic polymer utilizing the different pHs in the rumen and the abomasum. However, this method is not satisfactory considering that an organic solvent is used for coating, making coating agents expensive, potentially toxic, and so on.

As mentioned above, when preparing substances for the oral administration to ruminants, an important issue arisens in the preparation of pharmaceuticals so as to prevent the biologically active substances from being released in the rumen and permit elution of the biologically active substances in the post-abomasum digestive organs. While U.S. Pat. No. 3,493,652 discloses controlled release medical capsules comprising drugs, enzymes and substrates thereof, nothing is disclosed about preparing pharmaceuticals to prevent the drug from being released in the rumen, and it is thus difficult with this method to achieve sufficient ruminant absorption of the drug.

SUMMARY OF INVENTION

One object of the present invention is to provide stable protection of a biologically active substance in the rumen of ruminant animals and effective digestion and absorption of the substance through the post-abomasum digestive organs.

DESCRIPTION OF THE PREFERRED EMBODIMENTS

The present inventors have discovered that digesting functions inherent to the post-abomasum digestive organs of ruminant animals can be enhanced and excellent dissolution of biologically active substances in post-abomasum digestive organs can be achieved by providing a composition prepared by coating a core containing one or more biologically active substances with at least one protective substance selected from the group consisting of hardened vegetable fats and oils', hardened animal fats and oils, fatty acid esters and phospholipids, where the coating contains an enzyme which hydrolyses the protective coating substance itself and/or an enzyme activator which activates an enzyme secreted from the post-abomasum digestive organs of the ruminant which secreted enzyme hydrolyses the protective coating substance.

It has also been found that excellent protection in the rumen can be achieved when substantially no enzyme and no enzyme activator is present in an outermost surface portion of the coating layer.

More specifically, the present invention is directed to a granulated feed additive composition for ruminant animals characterized in that a core containing a biologically active substance is coated with a coating composition comprising A) and B) as set forth below and wherein the outermost surface portion of the coating layer contains substantially no B):

A) at least one substance selected from the group consisting of hardened vegetable fats and oils, hardened animal fats and oils, fatty acid esters and phospholipids; and B) an enzyme which hydrolyses said at least one substance A) (hereinafter, merely referred to as enzyme) and/or an enzyme activator which activates an enzyme secreted from post-abomasum digestive organs of the ruminant which secreted enzyme hydrolyses said at least one A) substance present in said coating (hereinafter, referred to as enzyme activator).

In the present invention, the biologically active substance may be any one or a mixture of two or more substances selected from various known nutrients, feeds and drugs containing, e.g., amino acids and derivatives thereof, hydroxy homologous compounds of amino acids and derivatives thereof, proteins, carbohydrates, fats, vitamins, veterinary drugs, etc.

More specifically, biologically active substances useful in the present invention include amino acids such as lysine, methionine, tryptophan and threonine; amino acid derivatives such as N-acylamino acid, calcium salts of N-hydroxymethylmethionine and lysine hydrochloride; hydroxy homologous compounds of amino acids such as 2-hydroxy-4-methylmercaptobutyric acid and salts thereof; natural nutrient powders such as grain powder, feather powder and fish powder; proteins such as casein, maize protein and potato protein; carbohydrates such as starch, sucrose and glucose; vitamins and substances having similar functions such as vitamin A, vitamin A acetate, vitamin A palmitate, vitamin B, thiamine, thiamine hydrochloride, riboflavin, nicotinic acid, nicotinamide, calcium pantothenate, choline pantothenate, pyridoxine hydrochloride, choline chloride, cyanocobalamin, biotin, folic acid, p-aminobenzoic acid, vitamin $D_2$, vitamin $D_3$ and vitamin E; tetracycline, aminoglycoside, macrolide and polyether antibiotics, anthelmintics such as Neguvon, helminthagogues such as piperazine, and hormones such as estrogen, stilbestrol, hexestrol, thyroprotein, goitrogen and growth hormone.

There is no limitation on the method used to prepare an invention core containing one or more biologically active substances. Granulated, preferably generally spherical particles are prepared through a common granulation, fluidized bed granulation or agitation granulation with the addition, if necessary, of thickener or diluent bases.

Applicable thickeners include cellulose derivatives such as hydroxyproplylcellulose, methylcellulose and sodium carboxymethylcellulose, vinyl derivatives such as polyvinyl alcohol and polyvinyl pyrrolidone, arabic gum, guar gum, sodium polyacrylate and xanthan gum.

Applicable diluent bases include starches, proteins and crystalline celluloses. If further required, calcium carbonate, calcium phosphate, talc etc. may be added as a weighing agent to adjust specific gravity. Normally, it is preferable to adjust the specific gravity of the particles coated with the protective substance to a range from 0.9 to 1.4.

The protective substance for use in coating the core containing said biologically active substance is at least one substance selected from the group consisting of hardened vegetable fats and oils, hardened animal fats and oils, fatty acid esters and phospholipids.

Applicable hardened vegetable fats and oils include hardened palm oil, hardened palm kernel oil, hardened soy bean oil, hardened rape oil, hardened castor oil and so on. Applicable hardened animal fats and oils include hardened beef tallow, hardened lard and so on. The fatty acid esters include monoesters, diesters or the like of saturated or unsaturated fatty acids and glycerin. As the phospholipid, phosphatidyl choline, phosphatidyl serine, phosphatidyl ethanolamine, lecithin, lysolecithin and derivatives thereof may be used.

The enzyme used in the present invention may be any enzyme which hydrolyses the protective substance coating the core. Examples include lipase, phospholipase and esterase. As for the origin of the enzyme, those originated from microorganisms, animals and plants may be used. Examples of the microorganisms may be Aspergillus, Bacillus, Rhizopus, Saccharomyces, Pseudomonas, Mucor, Candida and Penicillium. Exemplified animals are cattle, pigs and so on. Exemplified plants include coconuts, ricinus seeds, rice, wheat germ and so on. The amount of the enzyme used is not limited, and mixtures may be used. For example, lipase may be used in an amount of at least 5 fat digestibility units (a Japanese standard of Feed Additives) or more but not more than 1 million fat digestibility units per 1 gram of the coating layer.

The enzyme activator useful in the present invention may be any activator originated from animals or plants which has the above-described function. Enzyme activators useful in the present invention include bile, pancreatic juice extracts from gall bladder and pancreas. There is no limitation on an amount thereof used. For example, bile powder may be used in the amount ranging from 0.5 milligrams to 100 milligrams, both inclusive, per 1 gram of the coating layer. An extract from the pancreas (general name "Pancreatin") may be used in an amount ranging from 0.1 milligrams to 10 milligrams, both inclusive, per 1 gram of the coating layer.

The enzyme and/or the enzyme activator used in the present invention has little to no solubility in the at least one protective substance selected from the group consisting of hardened vegetable fats and oils, hardened animal fats and oils, glycerin esters of fatty acid and phospholipids and is typically supplied as aggregated or powdered solids. To exhibit protectability in the rumen and dissolution in the post-abomasum digestive organs, the enzyme and/or the enzyme activator are/is preferred to be in the form of fine powder. A particle diameter thereof may advantageously be 100 microns or smaller. An average particle diameter of 50 microns or smaller facilitates formation of the coating surface containing substantially no enzyme and/or enzyme activator.

The feed additive composition for the ruminants according to the present invention is characterized in that the biologically active substance is coated using, as a coating material, substances serving as hydrolysis substrates for the above mentioned enzyme or enzyme activator and wherein the outermost surface portion of the coating layer contains substantially no enzyme and/or enzyme activator. The term "the outermost surface portion contains substantially no enzyme/or enzyme activator" means substantially no degradation activity to the surface coating material by the enzyme in question is expressed or occurs during the residence time between entry of the rumen and entry of the abomasum of the ruminant. Thus, this includes a case where no or an extremely small amount of enzyme and/or enzyme activator is contained and a case where the enzyme and/or the activator of the enzyme are/is contained together with an inhibitor.

Water is indispensable to express enzyme action. Contact between the enzyme and water causes hydrolysis of the substrate which is a basic substance of the coating layer. As a result the coating layer is broken and the biologically active substance is dissolved. For the outermost surface layer, breakage of the coating layer is avoided in the rumen by means of preventing the enzyme from contact with rumen fluid, which otherwise would start the hydrolysis action of the enzyme, thereby exhibiting a protective effect and avoiding elution of the biologically active substance in the rumen. Accordingly, the thickness of the outermost surface layer may be adjusted depending on an amount of the enzyme and/or enzyme activator to be added, activity thereof, composition of the outermost surface layer and so on. Typically, the outermost surface layer is defined a thickness of four-fifths or less of the coating layer starting from the surface of the particle and proceeding inward, preferably one-fifth or less.

The particles in which the enzyme and/or enzyme activator is free from contact with the rumen fluid because of the protective effect of the outermost surface portion of the coating layer are subjected to effects of digestive enzymes secreted by the ruminant in the lower digestive organs at and after the duodenum. As a result, the coating layer is broken and the biologically active substance is dissolved. The enzyme and/or the enzyme activator contained in the coating layer enhance(s) the effects of the digestive enzymes secreted by the ruminant and enhance(s) breakage of the coating layer as well as dissolution of the biologically active substance. In addition, substances such as an emulsifying agent, an emulsion stabilizer and an inorganic salt may be added as dissolution enhancing additives to either or both of the coating outermost surface layer and a layer containing the enzyme and/or the enzyme activator, if necessary. Mixtures may be used.

Useful emulsifying agents include lecithin, lysolecithin, enzyme-treated lecithin, fatty acids, metal salts of fatty acid, glycerin esters of fatty acid, sorbitan esters of fatty acid, propylene glycol esters of fatty acid, sucrose esters of fatty acid, sterol, sphingolipid and derivatives of cholic acid.

Useful emulsifying agents include lecithin, lysolecithin, enzyme-treated lecithin, fatty acids, metal salts of fatty acid, glycerin esters of fatty acid, sorbitan esters of fatty acid, propylene glycol esters of fatty acid, sucrose esters of fatty acid, sterol, sphingolipid and derivatives of cholic acid.

Useful emulsion stabilizers include arabic gum, alginic acid, propylene glycol alginate, welan gum, curdlan, gum ghatti, karaya gum, xanthan gum, chitin, chitosan, sodium chondroitin sulfate, guar gum, gellan gum, tamarind gum, tara gum, tragacanth gum, furcellaran, pullulan, pectin and locust bean gum.

Useful inorganic salts include dibasic calcium phosphate, calcium carbonate, sodium carbonate, sodium bicarbonate and calcium sulfate. In addition, wax and waxes may be added.

The enzyme and/or the enzyme activator are/is not necessarily dispersed uniformly. For example, a gradient of concentration distribution may be generated such that the coating layer has a lower content at a portion closer to the surface of the particle and has a higher content at an inner portion closer to the core.

The feed additive composition for the ruminant animals according to the present invention is characterized in that the core containing said biologically active substance is coated with said protective substance. The amount of the protective substance coated is preferably as small as possible to achieve higher relative content of the biologically active material. However, an amount is required that allows for a sufficient level of protection of the biologically active substance in the rumen and it is typically preferred to coat 10–200 parts by weight of the protective substance relative to 100 parts by weight of the core containing the biologically active substance.

There is no specific limitation regarding the coating method, and coating may be accomplished through any one of the common coating methods such as fluidized bed coating, pan coating, metal coating, agitation coating and spray coating.

The granulated feed additive composition for the ruminants according to the present invention has a particle diameter of 3 mm or smaller but not smaller than 1.0 mm. The thickness of the coating layer usually ranges from 50 µm to 150 µm.

The present invention is described more in detail below in the context of a specifically delineated set of examples and controls. However, the scope of the present invention is not limited to these examples.

EXAMPLES

For the biologically active substance, dissolution volume of amino acids in the examples was analyzed through liquid chromatography.

Protectability in the Rumen

Approximately 1 g of prepared sample was introduced into a 300 ml Erlenmeyer flask, into which 200 ml of McDougall buffer solution equivalent to rumen fluid was poured and shaken at a temperature of 39° C. for 24 hours. After shaking, dissolution volume of the biologically active substance was analyzed to calculate the protectability in the rumen.

* McDougall buffer solution: a buffer solution obtained by dissolving following reagents in 1000 ml water.

Sodium bicarbonate:7.43 g

Disodium hydrogen phosphate-12 water salt:7.00 g

Sodium Chloride:0.34 g

Potassium Chloride:0.43 g

Magnesium Chloride-6 water salt:0.10 g

Calcium Chloride:0.05 g

Dissolution in the Abomasum

After completion of the protectability test, the shaken sample was recovered and was then introduced into a 300 ml Erylenmeyer flask, into which 2000 ml of Clark-Lubs buffer solution equivalent to gastric juice of the abomasum was poured and shaken at a temperature of 39° C. for 1 hour. After shaking, dissolution volume of the biologically active substance was analyzed to calculate the protectability in the abomasum.

* Clark-Lubs buffer solution: a buffer solution obtained by dissolving following reagents in 1000 ml.

Potassium Chloride:3.73 g

Hydrochloric acid:2.1 ml

Dissolution in Small Intestine

After completion of the dissolution test in the abomasum, the shaken sample was recovered and was then introduced into a 300 ml Erylenmeyer flask, into which 200 ml of buffer solution equivalent to intestine fluid was poured and shaken at a temperature of 39°C. for 7 hours. After shaking, dissolution volume of the biologically active substance was analyzed to calculate the protectibility in the small intestine.

The total dissolution rate in the above mentioned solution equivalent to the gastric juice of the abomasum plus the dissolution rate in the solution equivalent to the intestine fluid was determined as the dissolution rate in the post-abomasum digestive organs (hereinafter, referred to as the dissolution rate corresponding to the digestive organs).

Example 1

325 g of L-lysine monohydrochloride, 172.5 g of talc, 2.5 g of sodium carboxymethylcellulose and 135 g of water were fed into a kneader and were kneaded, following which cylindrical granules were obtained by using an extruding granulator having a mesh screen and 1.5 mmφ. The resultant granules were shaped by using a spheronizer (marumerizer, manufactured by Fuji Paudal Co., Ltd.) to produce generally spherical granules. The resultant spherical granules were dried by a fluidized bed drier, thereby obtaining cores containing L-lysine monohydrochloride in a particle size distribution from 1 mm to 2.5 mm in diameter.

A protective substance containing 1.68 parts, by weight, of Lipase A "AMANO" 6 (produced by Amano Pharmaceutical Co., Ltd.) was dissolved in 98.32 parts, by weight, of hardened beef tallow, which was coated on cores in a ratio of 35.8 parts, by weight, to 100 parts, by weight, of cores having an average particle diameter of 1.5 mm sieved through a screen. Subsequently, 7.2 parts, by weight, of dissolved hardened beef tallow was coated on 100 parts, by weight, of the initially coated cores. The above mentioned evaluation tests were conducted on these coated particles, as a result of which the dissolution rate in the rumen was 9% and the dissolution rate corresponding to the digestive organs was 76%.

Example 2

1.4 parts, by weight, of Lipase A "AMANO" 6 (produced by'Amano Pharmaceutical Co., LTD.) and 5 parts, by weight, of lecithin were added to 93.6 parts, by weight, of hardened beef tallow, which was mixed and melted. The coating composition was prepared in a same manner as in Example 1 and then coated on cores in a ratio of 14.3 parts, by weight, to 100 parts, by weight, of cores having an average particle diameter of 1.18 mm sieved from a screen. Subsequently, 5 parts, by weight, of lecithin was added to 95 parts, by weight, of hardened beef tallow, which was mixed and melted. The coating composition was coated on the initially coated cores in a ratio of 28.6 parts, by weight, to 100 parts, by weight, of initially coated cores to form the coating outermost surface layer. The above mentioned evaluation tests were conducted on these coated particles, as a result of which the dissolution rate in the rumen was 13% and the dissolution rate corresponding to the digestive organs of 78%.

Example 3

1.4 parts, by weight, of Lipase A "AMANO" 6 (produced by Amano Pharmaceutical Co., Ltd.), 5 parts, by weight, of lecithin and 5 parts, by weight, of calcium carbonate were added to 88.6 parts, by weight, of hardened beef tallow, which was mixed and melted. The coating composition was prepared in the same manner as in Example 1 and coated on cores in a ratio of 21.5 parts, by weight, to 100 parts, by weight, of cores having an average particle diameter of 2.00 mm sieved through a screen. Subsequently, 5 parts, by weight, of lecithin and 5 parts, by weight, of calcium carbonate were added to 90 parts, by weight, of hardened beef tallow, which was mixed and melted. The coating composition was coated on the initially coated cores in a ratio of 21.5 parts, by weight, to 100 parts, by weight, of initially coated cores to form the coating outermost surface layer.

The above mentioned evaluation tests were conducted on these coated particles, as a result of which the dissolution rate in the rumen was 14% and the dissolution rate corresponding to the digestive organs was 83%.

Example 4

1.4 parts, by weight, of Lipase A "AMANO" 6 (produced by Amano Pharmaceutical Co., Ltd.) and 5 parts, by weight, of lecithin were added to 93.6 parts, by weight, of hardened beef tallow, which was mixed and melted. The coating composition was prepared in a same manner as in Example 1 and coated on cores in a ratio of 2.6 parts, by weight, to 100 parts, by weight, of cores having an average particle diameter of 2.36 mm sieved through a screen. Subsequently, 0.48 parts, by weight, of Lipase A "AMANO" 6 (produced by Amano Pharmaceutical Co., Ltd.) and 5 parts, by weight, of lecithin were added to 94.52 parts, by weight, of hardened beef tallow, which was mixed and melted. The coating composition was coated on the initially coated cores in a ratio of 16.2 parts, by weight, to 100 parts, by weight, of initially coated cores. Further, 5 parts, by weight, of lecithin was added to 95 parts, by weight, of hardened beef tallow, which was then mixed and melted. The resultant coating solution was coated in a ratio of 17.7 parts, by weight, to 100 parts, by weight, of the doubly coated cores to form the outermost coating surface layer. The above mentioned evaluation tests were conducted on these coated particles, as a result of which the dissolution rate in the rumen was 14% and the dissolution rate corresponding to the digestive organs was 80%.

Example 5

1.4 parts, be weight, of Lipase A "AMANO" 6 (produced by Amano Pharmaceutical Co., Ltd.) and 5 parts, by weight, of lecithin were added to 93.6 parts, by weight, of hardened beef tallow, which was mixed and melted. The coating composition was prepared in a same manner as in Example 1 and coated on cores in a ratio of 14.3 parts, by weight, to 100 parts, by weight, of cores having an average particle diameter of 1.70 mm sieved through a screen. Subsequently, 5 parts, by weight, of lecithin and 5 parts, by weight, of xanthan gum were added to 90 parts, by weight, of hardened beef tallow, which was mixed and melted. The coating composition was coated on the initially coated cores in a ratio of 28.6 parts, by weight, to 100 parts, by weight, of initially coated cores to form the coating outermost surface layer. The above mentioned evaluation tests were conducted on these coated particles, as a result of which the dissolution rate in the rumen was 13% and the dissolution rate corresponding to the digestive organs was 85%.

Example 6

Cores containing methionine were obtained in the same manner as in Example 1 with 325 g of methionine, 172.5 g of talc, 2.5 g of sodium carboxymethylcellulose and 100 g of water. 0.5 parts, by weight, of pancreatin (produced by SIGMA Co., Ltd.) originated from a calf which had been finely ground into an average particle diameter of 25 microns and 5 parts, by weight, of lecithin were added to 94.5 parts, by weight, of hardened beef tallow, which was mixed and melted. The coating composition was prepared in a same manner as in Example 1 and coated on cores in a ratio of 14.3 parts, by weight, to 100 parts, by weight, of cores having an average particle diameter of 1.70 mm sieved through a screen. Subsequently, 5 parts, by weight, of lecithin was added to 95 parts, by weight, of hardened beef tallow, which was mixed and melted. The coating composition was coated on the initially coated cores in a ratio of 28.6 parts, by weight, to 100 parts, by weight, of initially coated cores to form the outermost coating surface layer. The above mentioned evaluation tests were conducted on these coated particles, as a result of which the dissolution rate in the rumen was 12% and the dissolution rate corresponding to the digestive organs was 82%.

Example 7

2 parts, by weight, of lecithin was added to 97.75 parts, by weight, of hardened beef tallow, which was mixed and melted. 0.25 parts, by weight, of bile powder (produced by Wako Pure Chemical Ltd.) finely ground into an average particle diameter of 30 microns was added and suspended. The resultant coating composition was prepared in a same manner as in Example 1 and coated on cores in a ratio of 17.6 parts, by weight, to 100 parts, by weight, of cores having an average particle diameter of 1.8 mm sieved through a screen. Subsequently, 3 parts, by weight, of lecithin was added to 97 parts, by weight, of hardened beef tallow, which was mixed and melted. The coating composition was coated on the initially coated cores in a ratio of 15.7 parts, by weight, to 100 parts, by weight, of initially coated cores to form the coating outermost surface layer. The above mentioned evaluation tests were conducted on these coated particles,as a result of which the dissolution rate in the rumen was 14% and the dissolution rate corresponding to the digestive organs was 76%.

Example 8

2 parts, by weight, of oleic acid was added to 97.7 parts, by weight, of hardened beef tallow, which was mixed and melted. 0.3 parts, by weight, of pancreatin (produced by SIGMA Co., Ltd.) originated from a calf that was finely ground into an average particle diameter of 25 microns was added and suspended. The resultant coating composition was prepared in a same manner as in Example 1 and coated on cores in a ratio of 18.6 parts, by weight, to 100 parts, by weight, of cores having an average particle diameter of 1.7 mm sieved through a screen. Subsequently, 2 parts, by weight, of oleinic acid was added to 98 parts, by weight, of hardened beef tallow, which was mixed and melted. The coating composition was coated on cores in a ratio of 12.4 parts, by weight, to 100 parts, by weight, of the initially coated cores. The above mentioned evaluation tests were conducted on these coated particles, as a result of which the dissolution rate in the rumen was 12% and the dissolution rate corresponding to the digestive organs was 79%.

Control Example 1

A protective substance containing 1.4 parts, by weight, of Lipase A "AMANO" 6 (produced by Amano Pharmaceutical Co., Ltd.) that was same in amount as in Example 1 was dissolved in 98.6 parts, by weight, of hardened beef tallow, which was coated on cores in a ratio of 42.9 parts, by weight, to 100 parts, by weight, of cores prepared in Example 1. The above mentioned evaluation tests were conducted on these coated particles, as a result of which the dissolution rate in the rumen was 34% and the dissolution rate corresponding to the digestive organs was 41%.

Control Example 2

0.48 parts, by weight, of Lipase A "AMANO" 6 (produced by Amano Pharmaceutical Co., Ltd.) that was same in amount as in Example 2, 5 parts, by weight, of lecithin and 5 parts, by weight, of calcium carbonate were added to and mixed with 89.52 parts, by weight, of hardened beef tallow. The resultant coating composition was melted and coated on cores in a ratio of 42.9 parts, by weight, to 100 parts, by weight, of cores prepared in Example 2. The above mentioned evaluation tests were conducted on these coated particles, as a result of which the dissolution rate in the rumen was 53% and the dissolution rate corresponding to the digestive organs was 41%.

Control Example 3

42.9 parts, by weight, of melted hardened beef tallow was coated on the cores to 100 parts, by weight, of cores prepared in Example 1. The above mentioned evaluation tests were conducted on these coated particles, as a result of which the dissolution rate in the rumen was 1% and the dissolution rate corresponding to the digestive organs was 5%.

Control Example 4

5 parts, by weight, of lecithin was added to 95 parts, by weight, of hardened beef tallow, which was mixed and melted. The resultant coating composition was coated on the cores in a ratio of 42.9 parts, by weight, to 100 parts, by weight, of the cores prepared in Example 2. The above mentioned evaluation test was conducted on these coated particles, as a result of which the dissolution rate in the rumen was 15% and the dissolution rate corresponding to the digestive organs was 20%.

This application is based on and claims priority to Japanese Applications 081979/1993 and 053741/1994, both of which are incorporated herein by reference.

The above mentioned results are set forth in Table 1 and Table 2. It is apparent that those samples according to the invention having no enzyme in the outermost surface portion of the coating layer exhibit superior protectability in the rumen and dissolution in the post-abomasum digestive organs. In addition, the invention feed additive compositions have superior dissolution in the post-abomasum digestive organs to the cases where no enzyme and/or activator of the enzyme is contained.

TABLE 1

| Example | 1 | 2 | 3 | 4 | 5 |
|---|---|---|---|---|---|
| Biologically Active Substance | Lysine monohydrochloride | Lysine monohydrochloride | Lysine monohydrochloride | Lysine monohydrochloride | Lysine monohydrochloride |
| Core part by weight | 100 | 100 | 100 | 100 | 100 |
| Coating Outermost Surface Layer part by weight | 7.2 | 28.6 | 21.5 | 17.7 | 28.6 |
| Composition % Beef Tallow | 100 | 95 | 90 | 95 | 90 |

TABLE 1-continued

|  |  |  |  |  |  |  |
|---|---|---|---|---|---|---|
|  | Hardened Oil |  |  |  |  |  |
|  | Lecithin | — | 5 | 5 | 5 | 5 |
|  | Calcium Carbonate | — | — | 5 | — | — |
|  | Xanthan Gum | — | — | — | — | 5 |
| Enzyme-containing Coating Layer part by weight |  | 35.8 | 14.3 | 21.5 | outer 16.2 inner 9.6 | 14.3 |
| Composition % | Beef Tallow Hardened Oil | 98.32 | 93.6 | 88.6 | outer 94.52 inner 93.6 | 93.6 |
|  | Lipase A "AMANO" | 1.68 | 1.4 | 1.4 | outer 0.48 inner 1.4 | 1.4 |
|  | Lecithin | — | 5 | 5 | outer 5 inner 5 | 5 |
|  | Calcium Carbonate | — | — | 5 | — | — |
| Dissolution Rate % | Rumen Equivalence | 9 | 13 | 14 | 14 | 13 |
|  | Digestive Organ Equivalence (abomasum + small intestine) | 76 | 78 | 83 | 80 | 85 |

| Example |  | 6 | 7 | 8 |
|---|---|---|---|---|
| Biologically Active Substance |  | Methionine | Lysine monohydrochloride | Lysine monohydrochloride |
| Core part by weight |  | 100 | 100 | 100 |
| Coating Outermost Surface Layer part by weight |  | 28.6 | 15.7 | 12.4 |
| Composition % | Beef Tallow Hardened Oil | 95 | 97 | 98 |
|  | Lecithin | 5 | 3 | — |
|  | Oleic Acid | — | — | 2 |
| Enzyme-containing Coating Layer part by weight |  | 14.3 | 17.6 | 18.6 |
| Composition % | Beef Tallow Hardened Oil | 94.5 | 97.75 | 97.7 |
|  | Bile Powder | — | 0.25 | — |
|  | Pancreatin | 0.5 | — | 0.3 |
|  | Lecithin | 5 | 2 | — |
|  | Oleic Acid | — | — | 2 |
| Dissolution Rate % | Rumen Equivalence | 12 | 14 | 12 |
|  | Digestive Organ Equivalence (abomasum + small intestine) | 82 | 76 | 79 |

TABLE 2

| Control |  | 1 | 2 | 3 | 4 |
|---|---|---|---|---|---|
| Biologically Active Substance |  | Lysine monohydrochloride | Lysine monohydrochloride | Lysine monohydrochloride | Lysine monohydrochloride |
| Core part by weight |  | 100 | 100 | 100 | 100 |
| Coating Outermost Surface Layer part by weight |  | 42.9 | 42.9 | 42.9 | 42.9 |
| Composition % | Beef Tallow Hardened Oil | 98.6 | 89.52 | 100 | 90 |
|  | Lipase A "AMANO" | 1.4 | 0.48 | — | — |
|  | Lecithin | — | 5 | — | 5 |
|  | Calcium Carbonate | — | 5 | — | — |
| Dissolution Rate % | Rumen Equivalence | 34 | 53 | 1 | 15 |
|  | Digestive organ Equivalence (abomasum + small intestine) | 41 | 41 | 5 | 20 |

What is claimed is:

1. A granulated feed additive composition for ruminant animals, consisting essentially of a core of biologically active substance coated with a layer of a coating composition, wherein said coating composition consists essentially of components A) and B) as set forth below and wherein four-fifth to one-fifth of the outermost portion of said layer contains no B) component:

A) at least one substance selected from the group consisting of hardened vegetable fats, hardened vegetable oils, hardened aniimal fats, hardened animal oils, fatty acid esters and phospholipids;

B) at least one of the following components:

B-1) 5–1,000,000 fat digestibility units of lipase per gram of coating composition;

B-2) 0.5–100 mg of bile powder per gram of coating composition;

B-3) 0.1–10 mg of pancreatinper gram of coating composition, said granulated feed additive having a particle diameter of about 1–3 mm.

2. The feed additive as claimed in claim 1, consisting of said core biologically active substance coated with said coating composition, wherein said coating composition consists of components A) and B-1).

3. The feed additive as claimed in claim 1 consisting of said core biologically active substance coated with said coating composition, wherein said coating composition consists of components A) and B-2).

4. The feed additive as claimed in claim 1, consisting of said core biologically active substance coated with said coating composition, wherein said coating composition consists of components A) and B-3).

* * * * *